UNITED STATES PATENT OFFICE.

ADOLF WILH. KEIM, OF GRÜNWALD, GERMANY, ASSIGNOR TO THE FABRIK KEIM'SCHER FARBEN DER STEINGEWERKSCHAFT OFFENSTETTEN, AKTIENGESELLSCHAFT, OF MUNICH, GERMANY.

COATING WALLS OR OTHER SURFACES.

SPECIFICATION forming part of Letters Patent No. 595,066, dated December 7, 1897.

Application filed July 14, 1894. Serial No. 517,604. (No specimens.) Patented in England June 1, 1893, No. 10,746, and in France September 29, 1893, No. 233,123.

*To all whom it may concern:*

Be it known that I, ADOLF WILH. KEIM, a citizen of the Kingdom of Bavaria, and a resident of Grünwald, Bavaria, Germany, have invented certain new and useful Improvements in Coating or Painting Walls or other Surfaces, (patented in France, No. 233,123, dated September 29, 1893, and in England, No. 10,746, dated June 1, 1893,) of which the following is a specification.

My invention relates to the art of coating walls either by plastering or stuccoing them—that is, applying a thick coating, plain or in relief and ornamental to them—or by painting them either with a plain continuous coating or with ornamental designs or paintings—that is, applying a thin coating to the walls either continuous and of one color or at portions only and, if desired, in various colors. Thus while my invention is designed, primarily, for mural decorations and paintings it is applicable to all methods of applying a coating to walls. All these different methods of treating the walls are comprised under the generic term "coating," which in this description and in the claims is used to designate any or all of them.

The object of my invention is to obtain a coating for walls which will be able to resist the ravages of time and the influence of any atmosphere and climate and which will be weatherproof and will not crumble or disintegrate under these agencies.

With this object in view the gist of my invention, broadly considered, resides in the hardening and seasoning of such coatings by causing the formation in the body of and particularly on the outer surface of such coatings of sulfate of barium and silica, both of which compounds are practically insoluble in all the substances which may come into contact with said coatings through the atmosphere or climatic phenomena. This finely-divided and intimately-mixed indurating agent, consisting of sulfate of barium and silica, has, so far as I am aware, never been used in connection with compositions for coating walls or for any analogous purpose. The formation of this indurating mixture of sulfate of barium and silica is effected by, and my invention, broadly considered, involves the addition to a suitable filling substance or base of soluble glass and barium carbonate, the subsequent application to the coating made with this mass of ammonium of sulfate and the final washing of its surface with water. The result of such treatment is that the silicate of potassium is decomposed, forming sulfate of potassium and silica, the ammonia of the ammonium sulfate escaping as a gas. The action of the water used causes the sulfate of potassium and barium carbonate to decompose and to form barium sulfate, which acts as a strong binding medium for the mass and, in conjunction with the silica, formed as stated above, constitutes a remarkably effective hardening agent and protection against the influences of the weather and corroding action of climatic changes.

The more specific features of my invention will be understood from the following description and pointed out in the claims hereunto appended.

It will be noted, then, that the coating to which my invention is applicable may be, first, a thick coating or plastering; second, a thin coating or paint. It is to be noted, moreover, that these two kinds of coatings may be used either alone or together—*i. e.*, after the thick coat or plaster has been applied to the wall, indurated according to my invention, the thin coat or, in other words, the paint may be applied to the said indurated thick coat or plaster, also indurated according to my invention.

I will describe these two kinds of coatings in the above order.

1. *Thick coating or plastering.*—This plastering makes a fine ground for painting on, among other uses, and is for the purpose of the latter preferably applied to a base or bottom layer. This plastering comprises a binding agent and other materials which are combined in the manner now to be described.

As a binding agent for the fine painting-ground or plastering I employ the following composition: kaolin or china-clay, 8.8 per cent.; white chalk, free of iron or calc-spar, 58.9 per cent.; potassium silicate, (soluble glass,) 27.4 per cent.; powdered glass, 4.2 per cent; sodium sulfid, .7 per cent. This mixture is ground and then burned or fired and after firing is again ground and mixed with about eight per cent., by volume, of barium carbonate.

In order to attain a fine painting-ground, the composition just mentioned is mixed with two parts of quartz-sand and two parts of marble-sand or comminuted marble, together with sufficient water, and then applied to a base or bottom layer. If it is desired that the surface so formed is to be ground off, the above mixture is varied by omitting the quartz-sand and employing four parts of marble-sand, since it is impossible to properly grind off a surface in which quartz-sand is used.

The thick coating above described may serve as a plain plastering or may be colored in any desired manner either by adding small quantities of metal salts before burning or by adding metal or mineral pigments after burning.

The coating must be kept moist for several days by spraying or washing from time to time with water. It must then first be impregnated with silico-fluoric acid ($H_2SiF_6$) and then impregnated with sulfate of ammonia in a moist state. The coating may also be painted upon with all kinds of paints—such as mineral paints, transparent lakes, distemper, wax, or oil paints, &c.

The plastering thus far described is preferably, though not necessarily, applied to a base or bottom layer prepared as follows: A mortar is prepared from about three to four parts, by volume, of quartz-sand or comminuted marble, one part of Portland cement, and water in sufficient quantity to make a good mortar. One hundred parts, by volume, of this mortar are then mixed with from five to ten parts of finely-ground barium carbonate, (witherite.) This mortar is applied as a layer of about one and one-half to two centimeters in thickness. After it has been on for a few hours it is coated with the plastering or fine painting-ground above described.

2. *Thin coating.*—As explained at the beginning of this specification, this thin coating may be either (*a*) in the form of a painting—that is to say, the coating is applied according to certain design in one or more colors—or (*b*) in the form of a uniform coat in one color, or, in other words, a paint. I will describe these in the order stated.

(*a*.) Compound for paintings: For weatherproof-paintings or paintings where exposed to the elements crude paints or colors capable of resisting the action of alkalies are employed, to which are added ten parts, by volume, of calcium fluorid, five parts of alumina hydrate, ten parts of silica hydrate, and about ten per cent. of the total volume of artificial barium carbonate mixed with water. After the painting has been made with the colors so prepared I fix the colors by the well-known Keim fixing solution, which is made by heating two liters potassium silicate together with one liter caustic ammonia, one hundred grams caustic potash, and one hundred and twenty grams marble-dust in a water-bath or similar gentle heating medium and then slowly cooling. The essential ingredients of this fixing solution are the potassium silicate and the caustic ammonia. This fixing solution is applied by spraying or otherwise washing the painting with the same, or it may be incorporated in the paints or colors before applying. When the fixing solution is completely dried on the painting, the said painting is saturated with a heated solution of sulfate of ammonium, the solution being applied to the entire painted surface three or four times, after which said surface is then thoroughly washed with water. By the last two steps first the alkali silicates—*i. e.*, silicates of potassium—are decomposed by the sulfate of ammonium, sulfate of potassium being formed and the ammonia of the sulfate of ammonium escaping as a gas. By the action of the water there is then formed from the sulfate of potassium the sulfate of barium, which acts as an exceedingly efficient binding medium, and, together with the silica precipitated from the alkali silicate or water-glass, serves to protect the painting against the weather, this production of the sulfate of barium and silica in the painting by chemical reaction constituting an essential feature of the new process.

(*b*.) Paint or plain coating: The colors for the weatherproof-paint are prepared in a manner similar to that set forth in connection with the weatherproof-paintings under *a* by mixing calcium fluorid, carbonate of barium and chalk, wetting the whole, grinding, drying, and then pulverizing the same. In spreading them upon or painting the wall they are mixed with a fixing medium containing seventy-four per cent. potassium silicate, four per cent. hydrate of silica, and twenty-two per cent. stiff starch. The paints so applied are fixed in a manner similar to that above described by a solution of sulfate of ammonium and washing with water.

The ammonium sulfate used in this process may in some cases be used together with ammonia-alum.

As will be seen from the above specification, the feature which is common to all the processes set forth and which constitutes the generic feature of my invention is the addition of soluble glass or alkali silicate and barium carbonate to a suitable filling substance, mortar or base, the subsequent application to the coating or article made of such mass of ammonium-sulfate and water.

What I claim, and desire to secure by Letters Patent, is—

1. The herein-described process of plastering or painting walls which consists in adding to the mortar or paint, to be used as the coating, alkali silicate and carbonate of barium, then applying the composition to the wall or surface to be coated, and then treating the same with sulfate of ammonium and water whereby silica is precipitated and barium sulfate formed as a cementing and indurating medium, substantially as set forth.

2. The herein-described process of plastering or painting walls which consists in adding to the mortar or paint forming the coating, alkali silicate and carbonate of barium, then applying the composition to the wall or surface to be coated and then treating the same with sulfate of ammonium, ammonia-alum and water, whereby an indurating and cementing medium combined of the precipitated silica and barium sulfate is formed, substantially as set forth.

3. The herein-described process of plastering or painting walls which consists in mixing china-clay, chalk, potassium silicate, powdered glass and sodium sulfid in substantially the proportions specified, then grinding and firing the same, then mixing therewith carbonate of barium, then mixing the whole with marble-sand and water, then applying the composition to the wall or surface to be coated and applying water and silico-fluoric acid to the coating, and finally treating the same with sulfate of ammonia, all substantially as set forth.

4. The herein-described process of plastering or painting walls which consists in combining china-clay, chalk free from iron or calc-spar, potassium silicate, powdered glass, and sodium sulfid, in substantially the proportions specified, then firing the same, then grinding and mixing therewith carbonate of barium, then adding water and finally adding a suitable reagent for producing insoluble compounds, substantially as set forth.

5. The herein-described process of plastering or painting surfaces which consists in combining china-clay, chalk free from iron or calc-spar, potassium silicate, powdered glass and sodium sulfid in substantially the proportions specified, then firing the same, then grinding and mixing with carbonate of barium, then mixing the whole with marble-sand, quartz-sand and water, then applying this composition as a coating, then treating the coating with water and silico-fluoric acid and finally treating the same with sulfate of ammonia, substantially as set forth.

In testimony that I claim the foregoing as my invention I have signed my name in presence of two subscribing witnesses.

ADOLF WILH. KEIM.

Witnesses:
  ALBERT WEICKMANN,
  CARL MAYER.